US008112516B2

(12) United States Patent
Wang et al.

(10) Patent No.: US 8,112,516 B2
(45) Date of Patent: Feb. 7, 2012

(54) SELECTIVE USER NOTIFICATION BASED ON IP FLOW INFORMATION

(75) Inventors: Alex Wang, Cary, NC (US); David Bainbridge, Acton, MA (US); Xiaohui Zhou, Cary, NC (US); Beecher Adams, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 707 days.

(21) Appl. No.: 11/844,317

(22) Filed: Aug. 23, 2007

(65) Prior Publication Data

US 2009/0055501 A1 Feb. 26, 2009

(51) Int. Cl.
*G06F 15/173* (2006.01)
(52) U.S. Cl. .................................. 709/224; 709/223
(58) Field of Classification Search ........... 709/223–229
See application file for complete search history.

(56) References Cited

U.S. PATENT DOCUMENTS

| | | | |
|---|---|---|---|
| 4,322,581 A | 3/1982 | Christain et al. | |
| 5,268,957 A | 12/1993 | Albrecht | |
| 5,577,111 A | 11/1996 | Iida et al. | |
| 6,021,262 A * | 2/2000 | Cote et al. ................. | 714/48 |
| 6,028,922 A | 2/2000 | Deutsch et al. | |
| 6,118,861 A | 9/2000 | Gutzmann et al. | |
| RE37,073 E | 2/2001 | Hammond | |
| 6,304,905 B1 * | 10/2001 | Clark ........................ | 709/224 |
| 6,389,127 B1 | 5/2002 | Vardi et al. | |
| 6,477,374 B1 | 11/2002 | Shaffer et al. | |
| 6,501,750 B1 | 12/2002 | Shaffer et al. | |
| 6,601,099 B1 | 7/2003 | Corneliussen | |
| 6,614,899 B1 | 9/2003 | Sollee et al. | |
| 6,615,236 B2 | 9/2003 | Donovan et al. | |
| 6,625,141 B1 | 9/2003 | Glitho et al. | |
| 6,636,594 B1 | 10/2003 | Oran | |
| 6,658,095 B1 | 12/2003 | Yoakum et al. | |
| 6,661,799 B1 | 12/2003 | Molitor | |
| 6,665,723 B2 | 12/2003 | Trossen | |
| 6,678,735 B1 | 1/2004 | Orton et al. | |
| 6,684,147 B2 | 1/2004 | Park et al. | |
| 6,731,625 B1 | 5/2004 | Eastep et al. | |
| 6,738,390 B1 | 5/2004 | Xu et al. | |
| 6,754,181 B1 | 6/2004 | Elliott et al. | |

(Continued)

OTHER PUBLICATIONS

Tuexen, M., et al., Cisco Technology, Inc. RFC 3237, Network Working Group, "Requirements for Reliable Server Pooling," Jan. 2002.
Quittek, J., et al., Cisco Technology, Inc., RFC 3917, Network Working Group, "Requirement for IP Flow Information Export (IPFIX)", Oct. 2004.

(Continued)

*Primary Examiner* — Faruk Hamza
(74) *Attorney, Agent, or Firm* — Baker Botts L.L.P.

(57) ABSTRACT

An example embodiment of the present invention provides a process that uses IP flow information to selectively notify users of an application server of the server's unavailability. In the example embodiment, the process, which might run on a system comprising a router, monitors IP flow records as to dropped packets and learns that an application server has become unavailable. The process then uses the IP flow records to identify active users of the application server, for example, by passing a source IP address to a presence service. Once the process has identified an active user, the process determines a means of notification for the user, which might be through the presence service, and transmits a notification to the user as to the unavailability of the application server. In the example embodiment, the process transmits a later notification as to the availability of the application server, using reverse camp-on functionality.

21 Claims, 4 Drawing Sheets

U.S. PATENT DOCUMENTS

| | | | |
|---|---|---|---|
| 6,763,384 B1 * | 7/2004 | Gupta et al. | 709/224 |
| 6,785,246 B2 | 8/2004 | Foti | |
| 6,788,676 B2 | 9/2004 | Partanen et al. | |
| 6,810,260 B1 | 10/2004 | Morales | |
| 6,850,978 B2 * | 2/2005 | Springmeyer et al. | 709/224 |
| 6,970,547 B2 | 11/2005 | Andrews et al. | |
| 7,003,569 B2 * | 2/2006 | Garg et al. | 709/225 |
| 7,076,043 B2 | 7/2006 | Curbow et al. | |
| 7,123,706 B2 | 10/2006 | Ooki | |
| 7,225,244 B2 * | 5/2007 | Reynolds et al. | 709/223 |
| 7,266,591 B1 | 9/2007 | Johnston | |
| 7,395,329 B1 * | 7/2008 | Holt et al. | 709/224 |
| 2002/0076032 A1 | 6/2002 | Rodriguez et al. | |
| 2002/0116485 A1 * | 8/2002 | Black et al. | 709/223 |
| 2002/0130791 A1 | 9/2002 | Stumer | |
| 2003/0081752 A1 | 5/2003 | Trandal et al. | |
| 2003/0161464 A1 | 8/2003 | Rodriguez et al. | |
| 2004/0165713 A1 | 8/2004 | Leighton | |
| 2006/0268698 A1 | 11/2006 | Shaffer et al. | |
| 2007/0124427 A1 | 5/2007 | Light et al. | |

OTHER PUBLICATIONS

Cisco Systems, Inc., "Cisco IOS NetFlow Version 9 Flow-Record Format", White Paper, Updated Feb. 2007.

USPTO Communication for Shumel Shaffer et al.,dated Dec. 11, 2009 for U.S. Appl. No. 11/117,247, filed Apr. 27, 2005, 19 pages.

USPTO Communication for Shumel Shaffer et al., dated Apr. 14, 2009, U.S. Appl. No. 11/117,247, filed Apr. 27, 2005,19 pages.

USPTO Communication for Shumel Shaffer, et al, dated Jul. 28, 2009, U.S. Appl. No. 11/120,912, filed May 3, 2005, 4 pages.

USPTO Communication for Shumel Shaffer, et al, dated Apr. 29, 2009, U.S. Appl. No. 11/120,912, filed May 3, 2005, 14 pages.

USPTO Communication for Shumel Shaffer, et al, dated Jan. 30, 2009, U.S. Appl. No. 11/120,912, filed May 3, 2005, 3 pages.

USPTO Communication for Shumel Shaffer, et al, dated Nov. 14, 2008, U.S. Appl. No. 11/120,912, filed May 3, 2005, 15 pages.

USPTO Communication for Shumel Shaffer, et al, dated May 14, 2008, U.S. Appl. No. 11/120,912, filed May 3, 2005, 12 pages.

* cited by examiner

US 8,112,516 B2

SELECTIVE USER NOTIFICATION BASED ON IP FLOW INFORMATION

TECHNICAL FIELD

The present disclosure relates to the use of IP flow information and application service availability notification.

BACKGROUND

NetFlow is an open but proprietary network protocol developed by Cisco Systems for collecting Internet Protocol (IP) traffic information. NetFlow runs on equipment with Cisco Internetwork Operating System (IOS), but served as the basis for RFC 2778. Cisco routers that have the NetFlow feature enabled generate NetFlow records that are exported from the router in User Datagram Protocol (UDP) or Stream Control Transmission Protocol (SCTP) packets and collected using a NetFlow collector.

Network flows can be been defined in many ways, but a common definition is as a 5-tuple, where a flow is defined as a unidirectional sequence of packets sharing the following values: (1) source IP address; (2) destination IP address; (3) source Transmission Control Protocol (TCP) port; (4) destination TCP port; and (5) IP protocol. The NetFlow protocol uses this definition.

Typically, a router outputs a flow record when the router determines that the flow is finished through, for example, the use of flow aging. Or a TCP session termination in a TCP flow might cause the router to expire the flow. Routers can also be configured to output a flow record at a fixed interval even if the flow is still ongoing.

A NetFlow record can contain a wide variety of information about the traffic in a given flow. For example, a Version 5 NetFlow record contains the following: (a) version number; (b) sequence number; (c) input and output interface for Simple Network Management Protocol (snmp) indices; (d) timestamps for the flow start and finish time; (e) number of bytes and packets observed in the flow; (f) Layer 3 headers, which include source and destination IP addresses, source and destination port numbers, IP protocol, and ToS (Type of Service) value; and (g) in the case of TCP flows, the union of all TCP flags observed over the life of the flow.

NetFlow records are usually sent via a UDP or SCTP in newer software and, for efficiency reasons, the router does not store NetFlow records once they are exported. The IP address of the NetFlow collector and the port upon which it is listening must be configured on the sending router. NetFlow is enabled on a per-interface basis in a router, which allows the router to export NetFlow records for dropped packets.

In computer and telecommunications networks, presence information is a status indicator that conveys ability and willingness of a potential communication partner, such as a user, to communicate. Presence information has been applied in different communication services, such as instant messaging (IM) and voice over IP (VoIP).

Called-party camp-on is a service feature of a communication system that enables the system to complete an access attempt in spite of issuance of a blocking signal by a busy user. Systems that provide this feature monitor the busy user until the blocking signal ends and then proceed to complete the requested access. In telecommunication systems, this feature permits holding an incoming call until the called party is free, hence the name "called-party camp-on". This feature has recently been extended to computer networks as reverse camp-on, where a busy server initiates a contact with an endpoint once the server is no longer busy.

DESCRIPTION OF THE DRAWINGS

For a complete understanding of the present invention and its advantages, reference is now made to the following description, taken in conjunction with the accompanying drawings, in which.

DESCRIPTION OF EXAMPLE EMBODIMENT(S)

In particular embodiments, the present invention provides methods, apparatuses, and systems directed to the use of IP flow information to identify and selectively notify users as to the availability and unavailability of an application service hosted by a server. In one particular embodiment, the notification of the users employs presence information maintained on a presence server and/or reverse camp-on functionality. The following example embodiments are described and illustrated in conjunction with apparatuses, methods, and systems which are meant to be examples and illustrative, not limiting in scope.

A. Network Topology

Figure 1:
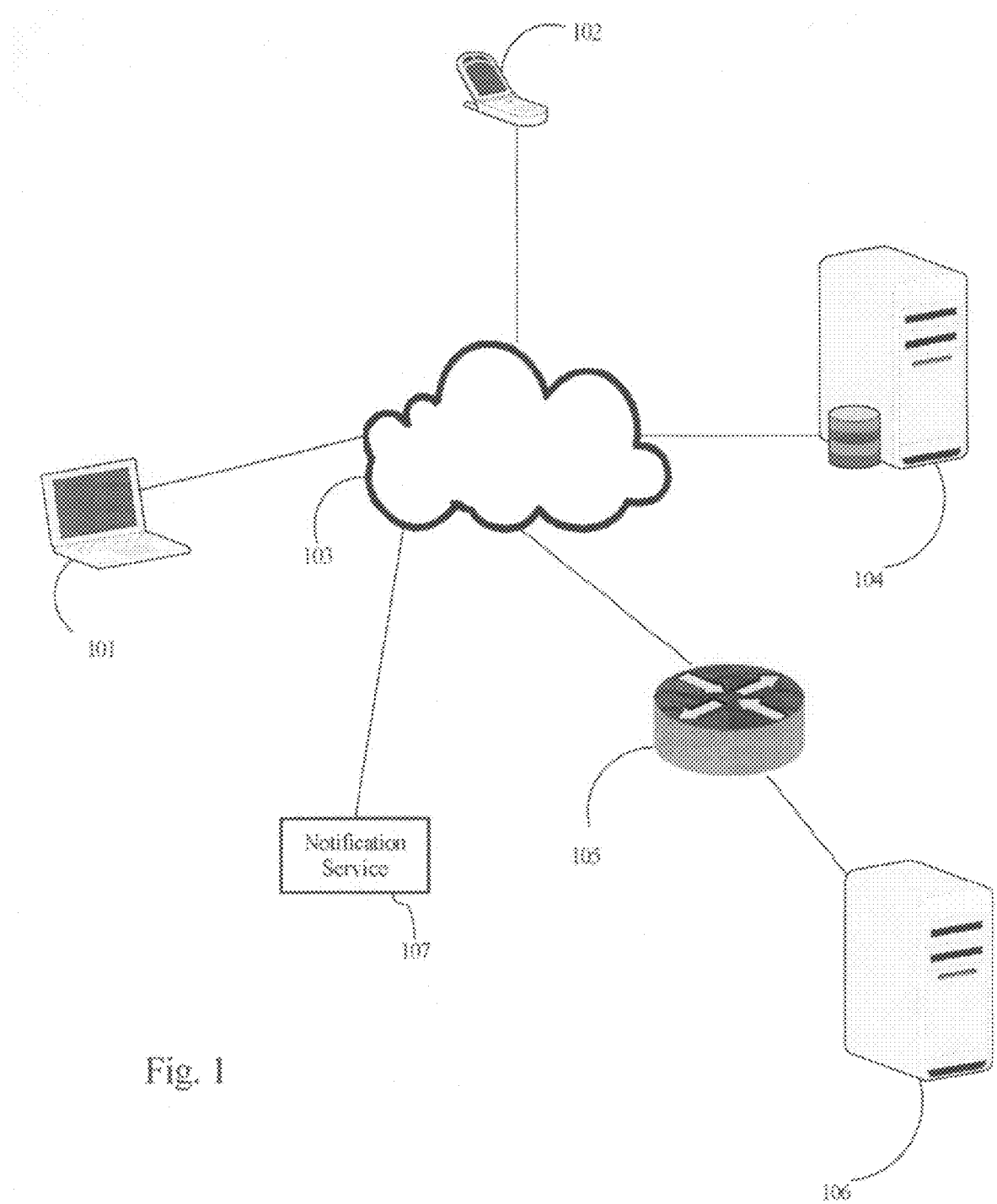
FIG. 1 is a diagram showing a network topology, which topology might be used with some embodiments of the present invention.

FIG. 1 is a schematic diagram showing a network topology, which topology might be used with some embodiments of the present invention. As shown in the diagram, two endpoints or client devices, a laptop 101 and a cell phone 102, are connected to a communication network 103, which communication network might comprise a local area network (LAN), wide area network (WAN), global distributed network such as the Internet, Intranet, Extranet, or any other form of wireless or wire-line communication network. Also connected to communication network 103 are an IP flow system 105, comprising a router/switch, and a presence server 104. The IP flow system 105 is also connected to an application server 106, which might be running a web application, an electronic commerce application, a database application, or any other application which receives input from an endpoint and/or transmits output to an endpoint. Notification service 107 is operative to monitor for, or receive, indications of application service unavailability, and notify one or more users of the application service unavailability. Notification service 107, in a particular implementation, is a computer-implemented process that may be hosted on any suitable device, such as a physical server, a router, switch or other network node.

In some embodiments, presence server 104 might be any combination of hardware, software, and/or encoded logic and is used to detect and monitor the presence of users at their endpoints. Presence server 104 might include a single computer or a group of computers that are capable of detecting the presence of users at an endpoint. In some embodiments, an endpoint might include a presence client application running on the endpoint, such as an instant messaging client. The presence server 104 may also be operative to provide availability or presence information of system users to one or more client applications connected to the presence server 104. Presence server 104 might detect that users are communicating on particular endpoints using a variety of communication methods. For example, presence server 104 might detect that a target user is currently communicating on his/her cell phone (e.g., cell phone 102), IP phone, work phone, home phone, pager, PDA, PC or any other communication device such as laptop 101. In addition, presence server 104 might detect that a user is currently communicating using a particular communication method, such as e-mail, instant messaging (IM), or Short Message Service (SMS).

In a particular embodiment, communication network 103 employs communication protocols that allow for the addressing or identification of endpoints and nodes, which nodes might include servers 104 and 106, coupled to communication network 103. For example, using Internet protocol (IP), each of the components coupled together by communication network 103 might be identified in information directed using IP addresses. In this manner, communication network 103 might support any form and/or combination of point-to-point, multicast, unicast, or other techniques for exchanging media packets among components coupled to it. Any network components capable of exchanging audio, video, or other data, including presence information, instant messages and Short Message Service (SMS) messages, using frames or packet, are included within the scope of the present invention.

Communication network 103 might also be directly coupled to other IP networks including, but not limited to, a LAN or the Internet. Since IP networks share a common method of transmitting data, telecommunication signals might be transmitted between telephony devices located on different, but interconnected, IP networks. In addition to being coupled to other IP networks, communication network 103 might also be coupled to non-IP telecommunication networks through the use of interfaces or components. It will be appreciated that IP networks transmit data (including voice and video data) by placing the data in packets and sending each packet individually to the selected destination, along one or more communication paths. Unlike a circuit-switched network, a dedicated circuit is not required for the duration of a call, IM session, SMS session or fax transmission over IP networks.

In particular embodiments, communication network 103 and the components coupled to it might receive and transmit data in a session initiation protocol (SIP) environment. SIP is an application-layer control protocol that includes primitives for establishing, modifying, and terminating communication sessions. SIP works independently of underlying transport protocols and without dependency on the type of session that is being established. SIP also transparently supports name mapping and redirection services, which, in turn, support personal mobility.

Still further, endpoints and/or client applications hosted on the endpoints, during connection initiation in enterprise networks, typically interact, and/or register, with a variety of systems, such as access points, controllers, switches, DHCP servers, authentication servers, directory servers and presence servers. Some of these systems may include information that allows for a mapping between an endpoint IP address and a user name corresponding to the user of the endpoint. This user name or other identity can then be used to identify one or more notification channels for a user. For example, with a user name, a notification process can access a presence server 104, for example, to determine whether an instant message or a VoIP call can be used as a notification method.

It will be recognized by those of ordinary skill in the art that in other embodiments, endpoints 101 and 102 might be any combination of hardware, software, and/or encoded logic that provides communication services to a user and performs the functionality described herein. For example, in such embodiments, endpoints 101 and 102 might include a telephone, a computer running telephony software, a video monitor, a camera, an IP phone, a cell phone or any other communication hardware, software, and/or encoded logic that supports the communication of packets of media (or frames) using communication network 103. Endpoints 101 and 102 might also include unattended or automated systems, gateways, other intermediate components, or other devices that can establish media sessions.

B. IP Flow System

Figure 2:
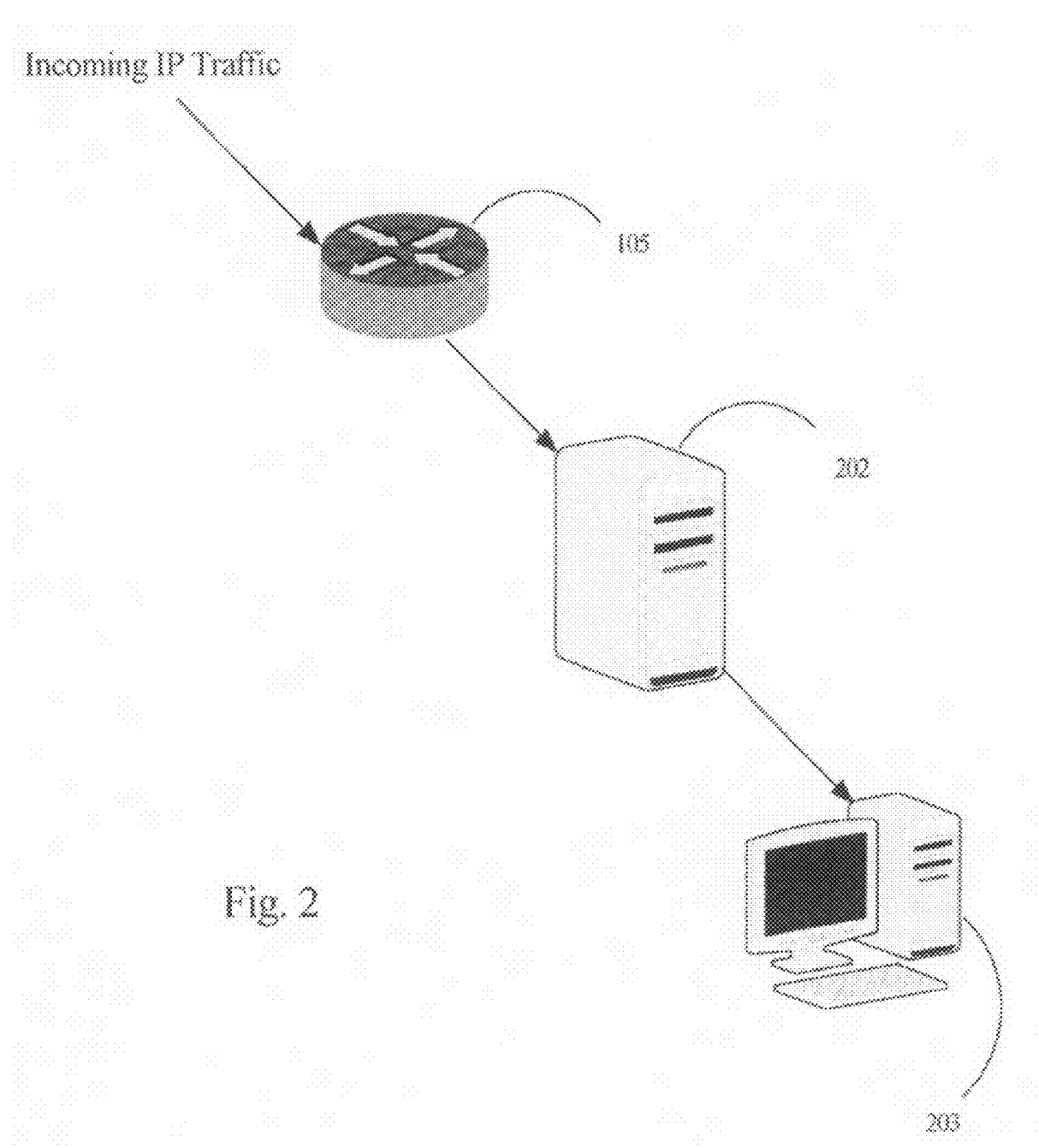
FIG. 2 is a diagram showing an IP flow system, which system might be used with some embodiments of the present invention.

FIG. 2 is a diagram showing an IP flow system, which IP flow system 105 might be used with some embodiments of the present invention. It will be appreciated that this IP flow system 105 might be used with the network topology shown in FIG. 1, for example. As shown in FIG. 2, incoming IP traffic is received by IP flow system 105, such as a router/switch (e.g., a Cisco® NetFlow router), which is a network forwarding device that gathers and stores information per flow. Once a flow expires, IP flow system 105 aggregates and filters the flow information and transmits it to collector 202, which is connected to the IP flow system 105 and which is depicted as a server in FIG. 2. Thereafter, the collected flow information might optionally be transmitted further to workstation 203, which runs an application program performing flow analysis. In a particular embodiment, the process described below might execute in whole or in part as software/firmware/hardware (i.e., encoded logic) on IP flow system 105, on collector 202, or on workstation 203.

A flow can be defined as a unidirectional or bidirectional sequence of packets with some common properties that pass through a network device. These collected flows are exported to an external device, such as a Cisco® NetFlow collector. Network flows may be highly granular; for example, flow records include details such as IP addresses, packet and byte counts, timestamps, Type of Service (ToS), application ports, input and output interfaces, TCP or other connection state information, and the like. The collected information for a given flow may be transmitted in one or more packets as a flow record. A flow may be identified or defined by a 5-tuple definition, where a flow may be defined as a unidirectional sequence of packets all sharing all of the following 5 values: 1) Source IP address; 2) Destination IP address; 3) Source TCP port; 4) Destination TCP port; and 5) IP protocol.

An IP flow system, such as a router, may output a flow record when it determines that the flow is finished. In a particular implementation, the IP flow system may accomplish this by flow aging: when a router, for example, sees new traffic for an existing flow it resets the aging counter. Also, TCP session termination in a TCP flow causes the router to expire the flow. Routers and other IP flow systems can also be configured to output a flow record at a fixed interval even if the flow is still ongoing.

A flow record can contain a wide variety of information about the traffic in a given flow. Cisco® NetFlow version 5, for example, contains one or more of the following information elements: 1) Version number, 2) Sequence number, 3) Input and output interface Simple Network Management Protocol (SNMP) indices, 4) Timestamps for the flow start and finish time, 5) Number of bytes and packets observed in the flow, and 6) Layer 3 headers: Source & destination IP addresses, Source and destination port numbers, IP protocol, and Type of Service (ToS) value. Furthermore, in the case of TCP flows, the union of all TCP flags observed over the life of the flow can be included in the flow record. By analyzing flow data, a picture of traffic flow and traffic volume in a network can be built. In addition, the flow records can also be analyzed for indications of application service unavailability, and/or the identity of a notification channel for one or more active users of an application server. For example, a set of flow records indicating that an application server 106 has not responded to connection initiation messages (e.g., TCP SYN packets) may indicate that the application server 106 is unavailable.

C. Hardware System for Router

Figure 3:
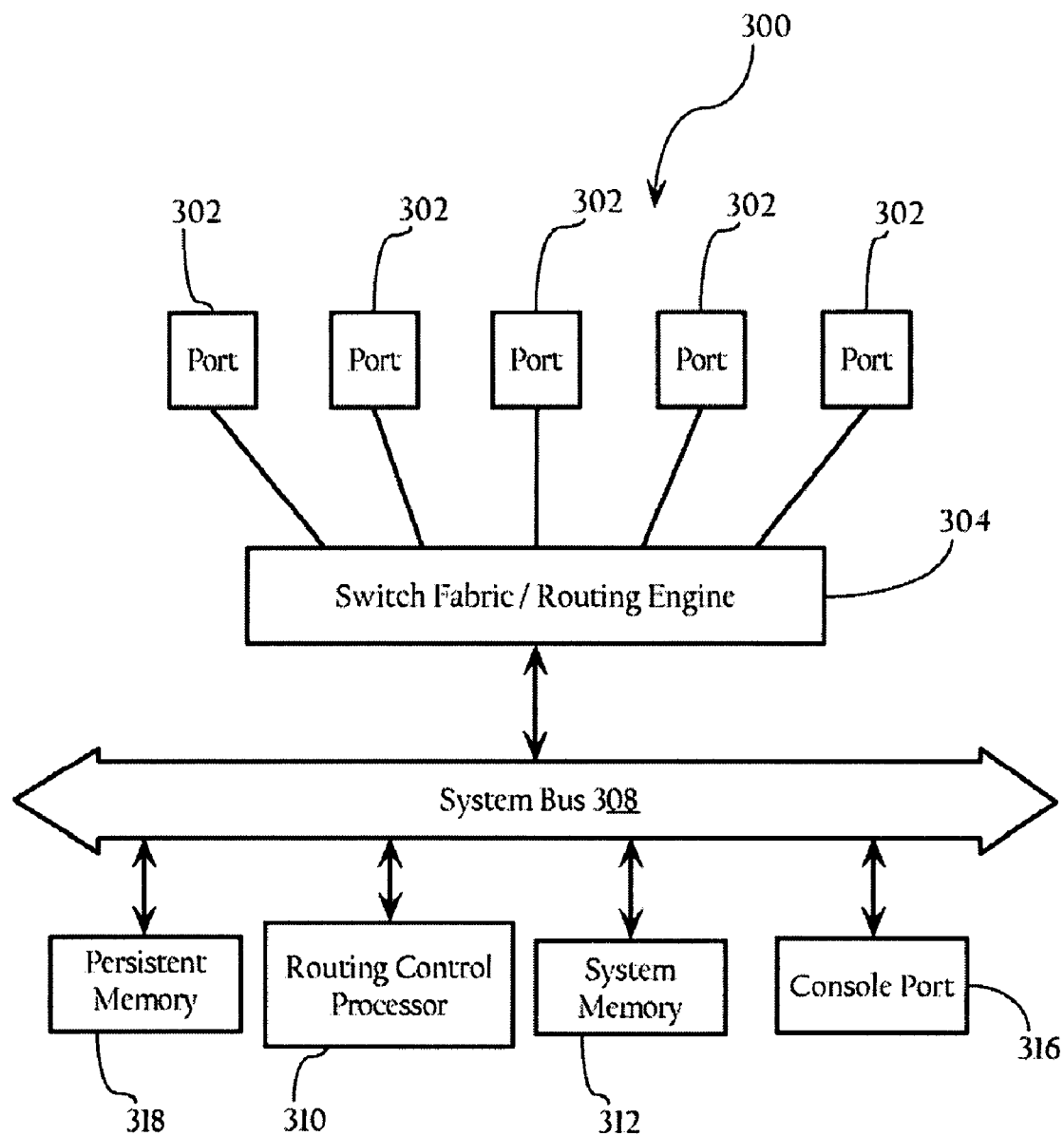
FIG. 3 is a diagram showing the hardware system for a router, which router might be used with some embodiments of the present invention.

FIG. 3 is a diagram showing the hardware system for a router, which router might be used as an IP flow system 105 with some embodiments of the present invention. In one embodiment, the hardware system 300 shown in FIG. 3 includes a routing processor 310, system memory 312, persistent memory 318 (e.g., flash memory or a hard disk drive), a routing engine/switch fabric 304 connected to a plurality of ports 302, a system bus 308 interconnecting these components, and one more software or firmware modules (loadable into system memory 312) directed to network routing functions (e.g., switch fabric and routing table/engine configuration, control message processing, BGP/IGP processing, Net-Flow record generation, and the like). Other functional modules might include discovery modules operative to discover the identity and capabilities of neighboring network devices. In one embodiment, one or more of the ports 302 might be Ethernet interfaces. The system architecture 300 might optionally include a console port 316 allowing for administrative access for purposes such as configuration and diagnostics.

D. User Notification Process Using IP Flow Information

Figure 4:
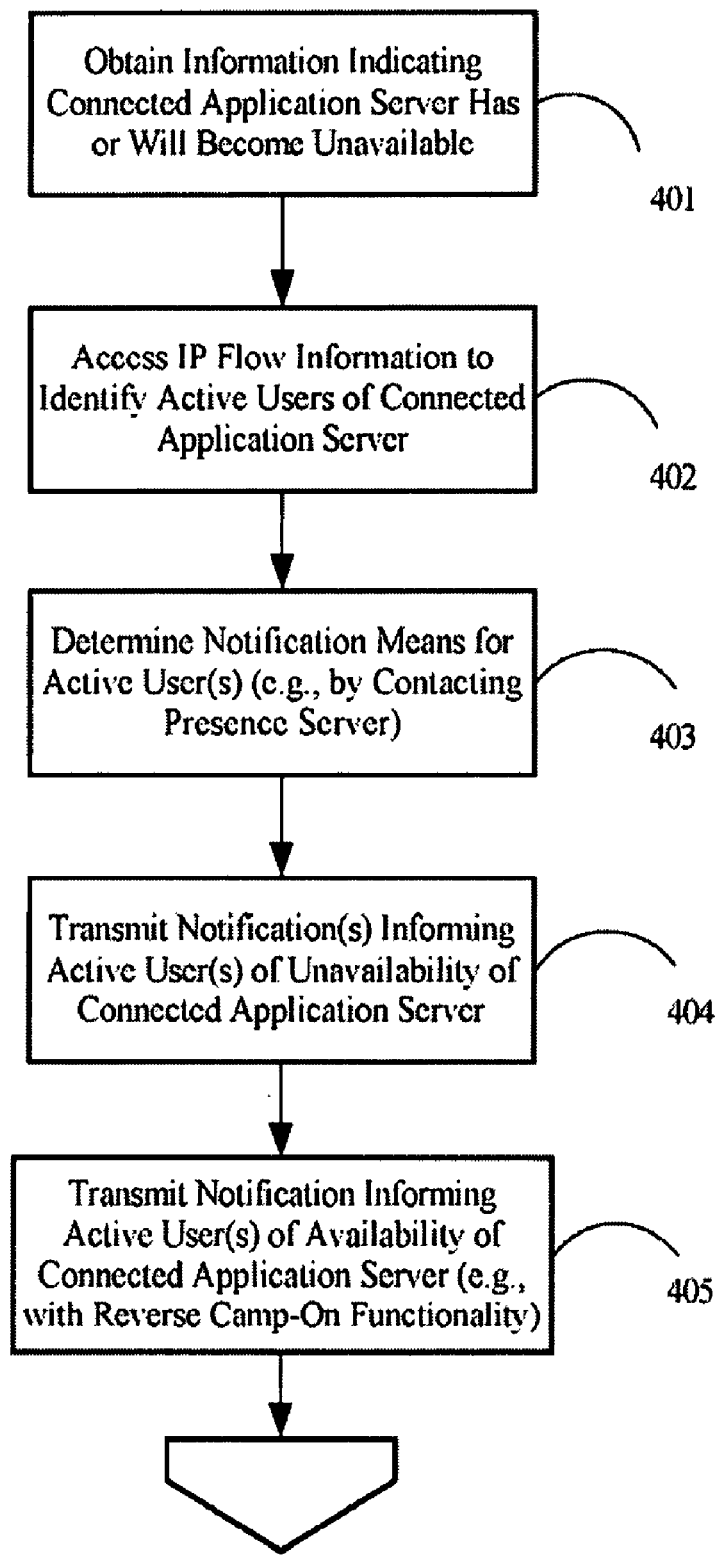
FIG. 4 is a diagram showing a flowchart of a user notification process using IP flow, which process might be used with some embodiments of the present invention.

FIG. 4 is a diagram showing a flowchart of a user notification process using IP flow information, which process might be used with some embodiments of the present invention. It will be appreciated that the process might run in whole or in part in any component of the IP flow information collection system shown in FIG. 2. In a particular implementation, IP flow system 105 may perform the process illustrated in FIG. 4. In other implementations, the notification processes may be performed by a server process hosted on a separate physical server. In the first step 401 of the process shown in FIG. 4, the process obtains information indicating that a connected application server (e.g., using a last-mile connection) has or will become unavailable. In step 402, the process uses IP flow information collected by collector 202, for example, to identify active users of the connected application server 106 and, in step 403, determines a notification channel for one or more active users, which determination might involve contacting a presence server 104 for stored information about an active user. The process then transmits a notification to the active user informing the user of the unavailability of the connected application server 106, in step 404. Finally, in step 405, the process optionally transmits a second notification to one or more of the active users, informing of the availability of the connected application server (e.g., through the use of the reverse camp-on functionality described in commonly-owned U.S. Patent Application No. 2006/0245567 and U.S. Patent Application No. 2006/0268698, whose disclosures are incorporated herein by reference for all purposes), when the connected application server 106 becomes available.

As described above, step 401 of the process obtains information indicating that a connected application server has or will become unavailable. Such an indication might be proactive, insofar a system administrator might know that the connected application server 106 is going down soon due to scheduled maintenance, unscheduled overloading, etc. For example, a network administrator may transmit a message to notification service 107 indicating that application server 106 is scheduled to be unavailable at a given point in the future. Moreover, the indication might not concern the connected application server 106 itself, but might rather concern the connection to the connected application server 106.

Further, in some embodiments, the IP flow system 105 might monitor the connected application server 106 to obtain an indication of unavailability or degraded performance, which degraded performance might be treated as a form of unavailability. As suggested above, IP flow records indicating dropped packets might be used for this purpose in some embodiments. For example, notification service 107 may process IP flow records maintained by collector 202 against a rule set to identify indications of application service unavailability. In other implementations, if a predefined number of dropped packets destined for the application server 106 occurs within a predefined period of time (as detected by a router, such as IP flow system 105), then an unavailability notification process might be triggered. For example, a failure of application server 106 may cause IP flow system 105 to buffer one or more packets destined for the application server 106. Generally, packets are buffered for a threshold period of time and then dropped or discarded. A threshold number of such packet drops may indicate application service unavailability. In such an embodiment, IP flow system 105 may transmit one or more messages to, or otherwise invoke, notification service 107 to identify active uses of the application server 106 and notify one or more active users. Other embodiments might use alternative, automated means for detecting application service unavailability, such as end-to-end (or E2E) monitoring.

As described above, step 402 of the process uses IP flow information to identify active users of the connected application server 106. In some embodiments, such identification might make use of the source or destination IP address which, as described earlier, is a field in an IP flow record. For example, the flow records that include the IP address of the application server 106 may be identified. The identified flow records may be further filtered to identify only those flow records where the time stamp is less than a threshold period of time from the current time to identify the most recent flow records. The IP addresses of the client nodes or end points (such as 101 and 102) may be identified by inspecting the source or destination IP address field depending on the direction of traffic flow corresponding to the flow records.

Notification service 107 may map the client IP addresses of the active users to other identifiers in order to select a notification channel. A presence service (e.g., running on a presence server 104) can use the identified client IP address to determine whether the IP address is associated with a user of the service.

Alternatively, the IP flow system might use the client IP address to map the client IP address to a hostname. In the case of a static IP address, the IP flow system 105 might contact a server running the Lightweight Directory Access Protocol (LDAP) to do such mapping. In the case of a dynamic IP address, the IP flow system 105 might contact a Dynamic Host Configuration Protocol (DHCP) server to do such mapping. In either case, the mapping server, such as an LDAP server, with the hostname might also be able to provide an enterprise user identifier (ID) identifying the owner of the endpoint (e.g., laptop) associated with the hostname, which enterprise user ID might then be used as an input into a presence service associated with the endpoint, or an alternative client endpoint associated with the enterprise user ID.

Still further, one or more rules can be applied to select a notification channel from a plurality of currently available notification channels.

It will be appreciated that step 403 might be logically related to step 402, insofar as the notification means might be dictated by the means used to identify an active user. For example, if a presence service can map a client IP address to a user of the application service hosted by application server 106, the presence service is an efficient means of notifying the user. However, another means of notification might be more appropriate due, for example, to the time of day. Some embodiments might choose from alternative means of notification depending upon such factors. Further, in some embodiments, the content of the notification might be either customized or predefined/automated. Some embodiments might use the latter type of notification in conjunction with the unscheduled unavailability of the connected application server.

Additionally, the information contained in the notification transmitted to active users can vary based on the notification channel and/or one or more attributes of the application service. For example, notification service 107 can use a default notification message. In other implementations, the notification service 107 may access a data set of posted notification messages that are associated with either an identified application service, server IP address, or port number and select a message based on one or more attributes of the application service. For example, if messages transmitted to the application service use a well-known port number, notification service 107 may select a notification message associated with the well-known port number. Still further, the notification service may select a notification message based on the notification channel. For example, short text notifications can be used for IM or SMS messages, while longer messages can be used for email clients.

Particular embodiments of the above-described process might be comprised of instructions that are stored on storage media. The instructions might be retrieved and executed by a processing system. The instructions are operational when executed by the processing system to direct the processing system to operate in accord with the present invention. Some examples of instructions are software, program code, firmware, and microcode. Some examples of storage media are memory devices, tape, disks, integrated circuits, and servers. The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiments that fall within the scope of the invention. In this regard, it will be appreciated that there are many possible orderings of the steps in the process described above and many possible modularizations of those orderings. As a result, the invention is not limited to the specific examples and illustrations discussed above, but only by the following claims and their equivalents.

What is claimed is:

1. A method, comprising:
   receiving an indication of unavailability of an application server;
   responsive to the indication of unavailability, accessing flow state information to identify one or more active clients of the application server, wherein the flow state information includes data from one or more data flows between the application server and the one or more clients, the data of the flow state information comprising a source internet protocol (IP) address, a destination IP address, a source transmission control protocol (TCP) port and a destination TCP port;
   determining a notification channel for one or more of the active clients, determining a notification channel comprising:
   obtaining one or more client IP addresses corresponding to one or more respective clients of the application server;
   providing one or more client IP addresses to a DHCP server to retrieve one respective hosts names;
   and accessing, using the respective host names, a directory service to retrieve one or more user identifiers; and
   transmitting a notification of unavailability of the application server to the one or more active clients over the respective determined notification channels.

2. The method of claim 1 wherein the determining a notification channel further comprises mapping the one or more client IP addresses to respective user identifiers.

3. The method of claim 2 wherein the determining a notification channel further comprises accessing a presence service using the one or more respective user identifiers.

4. The method of claim 1 wherein the determining a notification channel further comprises providing one or more client IP addresses to a presence service to retrieve one or more respective user identifiers.

5. The method of claim 1 wherein the determining a notification channel further comprises accessing a presence service using the one or more respective user identifiers.

6. The method of claim 1 wherein the transmitting the notification comprises selecting notification information based on one or more attributes of the application server.

7. The method of claim 1 wherein the transmitting the notification comprises selecting notification information based on one or more attributes of the notification channel.

8. The method of claim 1 further comprising
   receiving an indication of availability of the application server; and
   transmitting a notification of availability of the application server to the one or more active clients using the respective determined notification channels.

9. The method of claim 1 wherein the indication of unavailability of an application server is obtained by monitoring IP flow records for indications of dropped packets destined for the application server.

10. The method of claim 1 wherein the indication of unavailability of an application server is obtained from a routing system reporting one or more dropped packets destined for the application server.

11. One or more non-transitory computer-readable storage media containing instructions operable, when executed, to:
    receive an indication of unavailability of an application server;
    responsive to the indication of unavailability, access flow state information to identify one or more active clients of the application server, wherein the flow state information includes data from one or more data flows between the application server and the one or more clients, the data of the flow state information comprising a source internet protocol (IP) address, a destination IP address, a source transmission control protocol (TCP) port and a destination TCP port;
    determine a notification channel for one or more of the active clients;
    determining a notification channel comprising:
    obtaining one or more client IP addresses corresponding to one or more respective clients of the application server;
    providing one or more client IP addresses to a DHCP server to retrieve one respective hosts names; and accessing, using the respective host names, a directory service to retrieve one or more user identifiers, and transmit a notification of unavailability of the application server to the one or more active clients over the respective determined notification channels.

12. The media of claim 11 wherein the instructions are further operable, when executed, to: map the one or more client IP addresses to respective user identifiers.

13. The media of claim 12 wherein the instructions are further operable, when executed, to: access a presence service using the one or more respective user identifiers.

14. The media of claim 11 wherein the instructions are further operable, when executed, to: provide one or more client IP addresses to a presence service to retrieve one or more respective user identifiers.

15. The media of claim 11 wherein the instructions are further operable, when executed, to: access a presence service using the one or more respective user identifiers.

16. The media of claim 11 wherein the instructions are further operable, when executed, to: select notification information based on one or more attributes of the application server.

17. The media of claim 11 wherein the instructions are further operable, when executed, to: select notification information based on one or more attributes of the notification channel.

18. The media of claim 11 wherein the instructions are further operable, when executed, to:

receive an indication of availability of the application server; and transmit a notification of availability of the application server to the one or more active clients using the respective determined notification channels.

19. The media of claim 11 wherein the indication of unavailability of an application server is obtained by monitoring IP flow records for indications of dropped packets destined for the application server.

20. The media of claim 11 wherein the indication of unavailability of an application server is obtained from a routing system reporting one or more dropped packets destined for the application server.

21. An apparatus comprising:
one or more network interfaces;
a memory;
one or more processors; and
a notification process module comprising computer readable instructions operative to cause the one or more processors to:
receive an indication of unavailability of an application server;
responsive to the indication of unavailability, access flow state information to identify one or more active clients of the application server, wherein the flow state information includes data from one or more data flows between the application server and the one or more clients, the data of the flow state information comprising a source internet protocol (IP) address, a destination IP address, a source transmission control protocol (TCP) port and a destination TCP port;
determine a notification channel for one or more of the active clients;
determining a notification channel comprising:
obtaining one or more client IP addresses corresponding to one or more respective clients of the application server;
providing one or more client IP addresses to a DHCP server to retrieve one respective hosts names; and
accessing, using the respective host names, a directory service to retrieve one or more user identifiers; and
transmit a notification of unavailability of the application server to the one or more active clients over the respective determined notification channels.

* * * * *